UNITED STATES PATENT OFFICE.

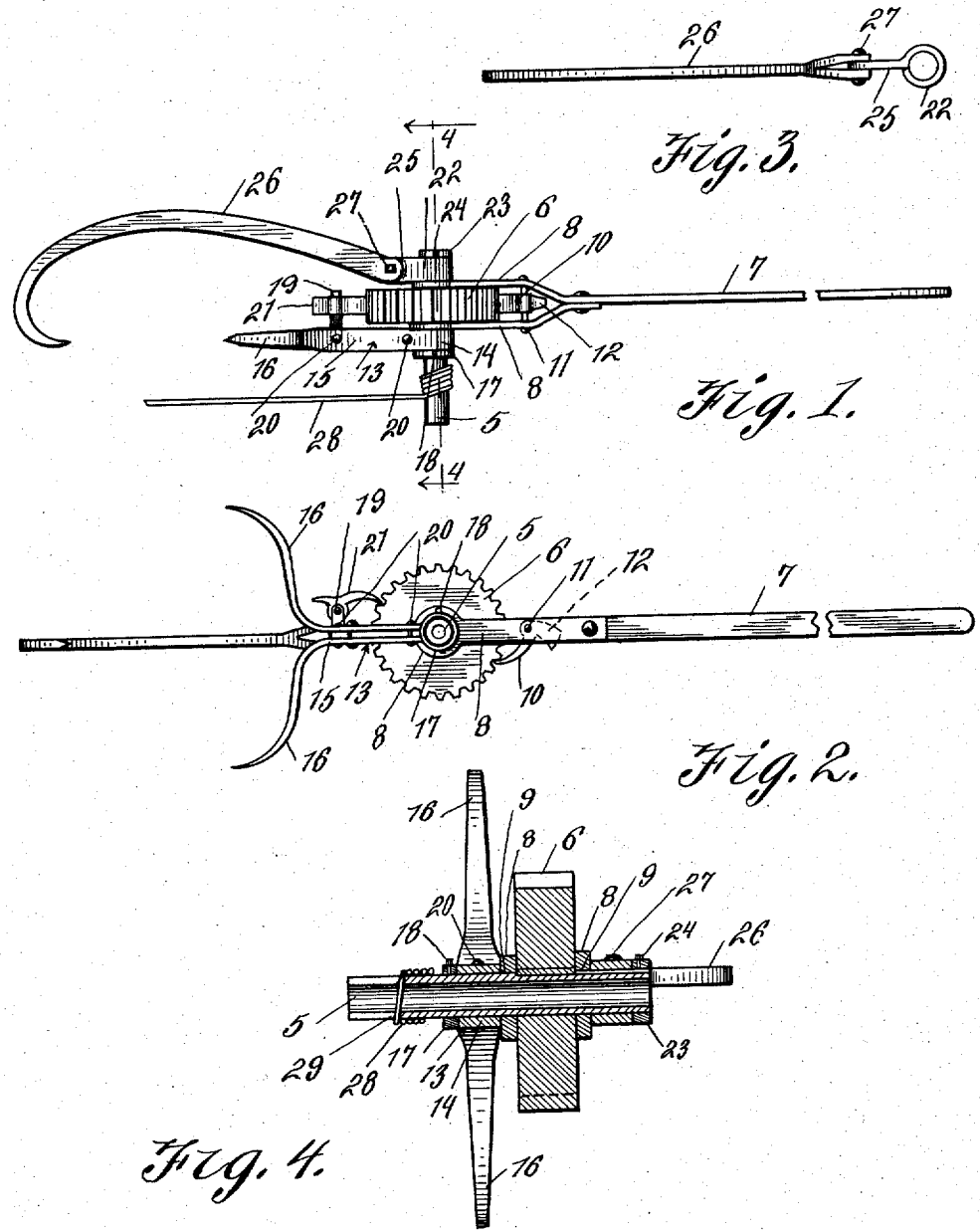
T. V. FLEMING.
WIRE STRETCHER.
APPLICATION FILED JAN. 19, 1915.
1,162,999.
Patented Dec. 7, 1915.

THOMAS V. FLEMING, OF SWIFTON, ARKANSAS, ASSIGNOR, BY MESNE ASSIGNMENTS, OF ONE-HALF TO J. N. MOON, OF SWIFTON, ARKANSAS.

WIRE-STRETCHER.

1,162,999.  Specification of Letters Patent.  Patented Dec. 7, 1915.

Application filed January 19, 1915.  Serial No. 3,102.

*To all whom it may concern:*

Be it known that I, THOMAS V. FLEMING, a citizen of the United States, residing at Swifton, in the county of Jackson and State of Arkansas, have invented certain new and useful Improvements in Wire-Stretchers, of which the following is a specification.

My invention relates to improvements in wire stretchers.

An important object of the invention is to provide a wire stretcher which is highly practical, and adapted to successfully compete with more or less similar devices in a highly crowded art, by virtue of its simplicity of construction, inexpensiveness to manufacture, lightness, and convenience in use.

A further object of the invention is to provide means of the above mentioned character, formed of few and simple parts which may be readily separated and assembled for the purpose of shipment and use, respectively.

Other objects and advantages of the invention will be apparent during the course of the following description.

In the accompanying drawings forming a part of this specification and in which like numerals are employed to designate like parts throughout the same, Figure 1 is a plan view of a wire stretcher embodying my invention, Fig. 2 is a side elevation of the same, Fig. 3 is a similar view of a relatively movable claw-lever, and, Fig. 4 is a transverse sectional view taken on line 4—4 of Fig. 1.

In the drawings, wherein for the purpose of illustration is shown a preferred embodiment of my invention, the numeral 5 designates a preferably tubular transverse shaft or spindle, which is adapted to be substantially horizontally arranged, when in use. This shaft has a toothed wheel or pinion 6 splined thereon to rotate the same, preferably near and spaced from one end thereof.

The numeral 7 designates a vertically swinging operating lever, having its inner attaching end forked, providing spaced tines 8, arranged upon opposite sides of the toothed wheel 6, with their ends apertured at 9, as more clearly shown in Fig. 4, for rotatably receiving the transverse shaft 5. Disposed within or between the tines 8 is a depending pawl 10, the operating end of which is adapted to engage with the toothed wheel 6, to turn the same upon the downward movement of the lever 7. The pawl 10 is pivotally connected with the tines 8 by a bolt 11, carried thereby, and is provided at its upper end with a counter-weight 12, serving to normally hold the pawl in engagement with the toothed wheel.

The numeral 13 designates a relatively rigid metal strip or bar, bent upon itself between its ends to form a circular head 14 rotatably mounted upon the shaft 5 outwardly of and adjacent one tine 8, as shown. The bar 13 is extended beyond the head 14 in the form of relatively short preferably straight and parallel arms 15, carrying outwardly diverging claws 16, which are preferably pointed, and adapted to be arranged in a substantially vertical position, in use. A ring 17 is arranged upon one end of the shaft 5 outwardly of and adjacent the head 14, and is detachably locked to the shaft by a clamping bolt 18 or the like. Disposed between the arms 15 is a bracket or member 19, rigidly attached thereto by one of a plurality of bolts 20, serving to connect these arms. A pawl 21 is pivoted upon the bracket 19 and engages with the upper portion of the toothed wheel 6, to prevent backward rotation thereof.

The numeral 22 designates a sleeve or head, pivotally or rotatably mounted upon the opposite end of the shaft 5 outwardly of and adjacent the opposite tine 8. The sleeve 22 is held against longitudinal displacement upon the shaft 5 by a stop ring or member 23, clamped or locked thereto by a bolt 24, as shown. The sleeve 22 carries an extension 25, more clearly shown in Fig. 3, fitting within the forked end of a movable claw-lever 26, and pivoted thereto, as shown at 27. This claw-lever is adapted to be swung in a substantially horizontal plane, when in use, and has its outer end preferably laterally curved and pointed.

One end of the shaft 5 projects beyond the head 14 for a substantial distance, to have the wire 28 wound thereon, and the same is preferably provided with longitudinal slots 29, receiving and clamping a portion of the wire while the same is being wound upon the shaft. It is to be understood that any other suitable means may be employed to connect the wire directly with the shaft, which is preferable as it enables the wire to be attached to the post upon which the stretcher is mounted, but a chain or other flexible element (not shown) may be permanently connected with the shaft 5 to be wound thereon and provided with means for detachable engagement with the wire.

In the use of the apparatus, the claw-lever 26 is first passed about the post, subsequent to which the claws 16 are swung into engagement with the opposite side of the post. The wire 28 is connected with the shaft 5, and upon swinging the lever 7 up and down will be wound thereon. As the wire 28 is wound upon the shaft 5, the same tends to further swing or move the prongs 19 into engagement with the post, thus more securely attaching the stretcher to the post. The lever 7 being adapted to be swung in a substantial vertical plane, enables the operator to more conveniently actuate the same, by practically placing his entire weight thereon. By removing the rings 17 and 23, the toothed wheel 16, head 14, and sleeve 22, may be removed from the shaft 5, together with the lever 7, whereby these parts may be conveniently packed in close relation for shipment. Particular attention is called to the fact that the toothed wheel, operating lever, claws and claw-lever are all carried by the transverse shaft 5, thus dispensing with the use of a more or less complicated frame or body portion, upon which these parts are ordinarily mounted.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a wire stretcher of the character described, a rotatable shaft adapted to be approximately horizontally arranged when in use, a toothed wheel carried by the shaft to rotate the same, a lever adapted to be swung in an approximately vertical plane and pivotally connected with the shaft in proximity to the toothed wheel, a pawl carried by the lever and engaging the toothed wheel, claws having an arm pivotally connected with the shaft and adapted to be approximately vertically arranged when in use and disposed upon one side of the toothed wheel, a claw-lever pivotally connected with the shaft upon the opposite side of the toothed wheel and adapted to be approximately horizontally arranged when in use, and means carried by said arm to prevent back turning of the toothed wheel.

2. In a wire stretcher of the character described, a rotatable shaft adapted to be approximately horizontally arranged when in use, a toothed wheel carried by the shaft to rotate the same, an operating lever pivotally mounted upon the shaft and adapted to be swung in an approximately vertical plane, a pawl carried by the lever and engaging the toothed wheel, a relatively rigid bar bent about the shaft upon one side of the toothed wheel and extending therefrom in the form of an arm carrying diverging claws which are adapted to be approximately vertically arranged when in use, a sleeve pivotally mounted upon the shaft and disposed upon the opposite side of the toothed wheel, a claw-lever pivotally connected with the sleeve and adapted to be approximately horizontally arranged when in use, and means carried by said arm for preventing back turning of the toothed wheel.

3. In a wire stretcher of the character described, a rotatable shaft adapted to be approximately horizontally arranged when in use, a toothed wheel carried by the shaft to rotate the same, an operating lever having an apertured forked end straddling the toothed wheel and pivotally mounted upon the shaft and adapted to be swung in an approximately vertical plane, a pawl pivotally mounted within the forked end of the lever and engaging the toothed wheel, a bar bent upon itself providing a head rotatably mounted upon the shaft upon one side of the toothed wheel and extended therefrom to provide normally substantially horizontal arms carrying diverging claws, a bracket arranged between and secured to the arms, a pawl pivotally mounted upon the bracket and engaging the toothed wheel, a sleeve pivotally mounted upon the shaft upon the opposite side of the toothed wheel, and a claw lever pivotally connected with the sleeve and adapted to be swung at approximately a right angle with relation to the claws.

4. In a wire stretcher of the character described, a rotatable shaft adapted to be approximately horizontally arranged when in use, a toothed wheel splined upon the rotatable shaft, an operating lever having one end apertured to receive the shaft, a pawl pivotally connected with the lever and engaging the toothed wheel, a head pivotally mounted upon the shaft and carrying diverging claws adapted to be approximately vertically arranged when in use, means carried by the claws to prevent back turning of the toothed wheel, a sleeve pivotally mounted upon the shaft upon the opposite side of the toothed wheel, a claw-lever pivotally connected with the sleeve and adapted to be approximately horizontally arranged when in use, and stop members rigidly and detachably connected with the shaft outwardly of and adjacent the head and sleeve.

In testimony whereof I affix my signature in presence of two witnesses.

THOMAS V. FLEMING.

Witnesses:
E. T. CASHION,
A. D. COFFIN.

Copies of this patent may be obtained for five cents each, by addressing the "Commissioner of Patents, Washington, D. C."